(Model.)
B. G. & G. H. HANDY.
ANTI-FRICTION BEARING.
No. 405,031. Patented June 11, 1889.
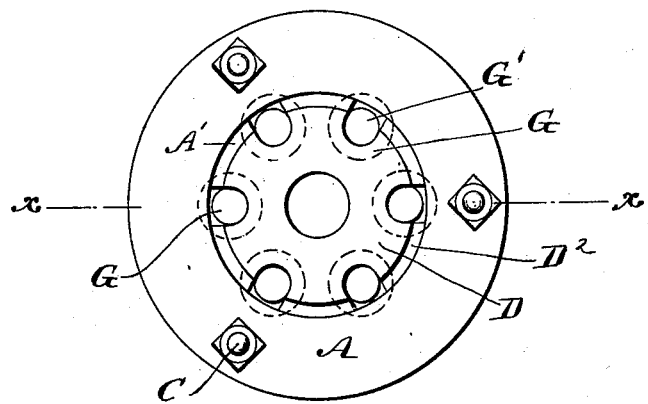
Fig. 1
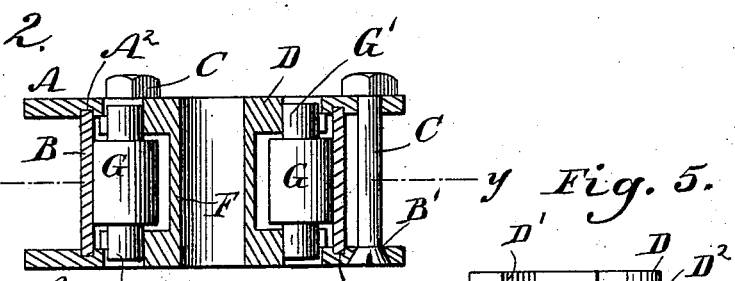
Fig. 2
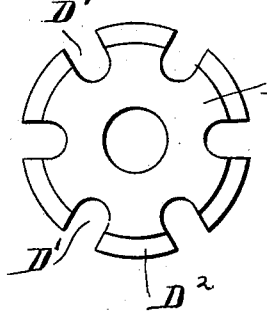
Fig. 4
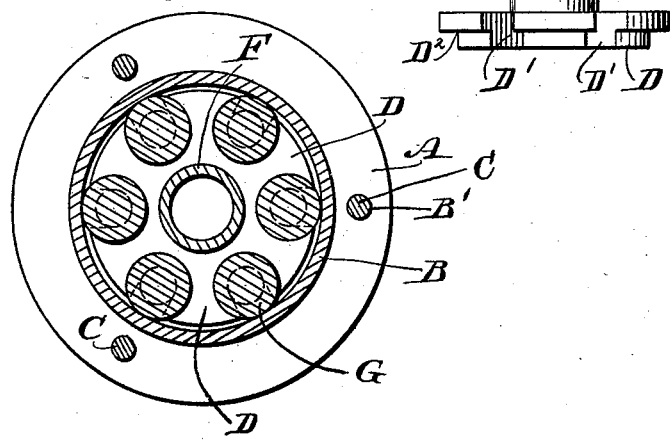
Fig. 3
Fig. 5
WITNESSES:
John M. Beemer
C. Sedgwick
INVENTOR:
B. G. Handy
G. H. Handy
BY Munn & Co.
ATTORNEYS.
N. PETERS. Photo-Lithographer. Washington, D. C.

UNITED STATES PATENT OFFICE.

BETHUEL G. HANDY AND GEORGE H. HANDY, OF MONROE, NEW YORK.

ANTI-FRICTION BEARING.

SPECIFICATION forming part of Letters Patent No. 405,031, dated June 11, 1889.

Application filed September 20, 1888. Serial No. 285,865. (Model.)

*To all whom it may concern:*

Be it known that we, BETHUEL G. HANDY and GEORGE H. HANDY, of Monroe, in the county of Orange and State of New York, have invented a new and Improved Anti-Friction Bearing, of which the following is a full, clear, and exact description.

The object of our invention is to construct a roller-bushing for sheaves which shall be both simple and effective, insuring a uniform and steady movement of the parts with the minimum degree of friction; and it consists in the parts which will be hereinafter described, and pointed out in the claims.

Reference is to be had to the accompanying drawings, forming a part of this specification, in which similar letters of reference indicate corresponding parts in all the figures.

Figure 1 is a side view of our invention. Fig. 2 is a section on the line $x\,x$ of Fig. 1. Fig. 3 is a section on the line $y\,y$ of Fig. 2. Fig. 4 is a side view of the box, and Fig. 5 is top view of said box.

A A are two parallel plates, each provided with a central opening A', and each also provided on its inner side with a circumferential groove $A^2$. A band-ring B has its respective side or edges seated in the grooves aforesaid. The plates A extend outward beyond the periphery of the ring B, and said extensions or flanges are provided with openings B' for the reception of bolts C. The plates A and ring B form a casing for the roller mechanism, the said plates extending inward beyond the ring, so as to form inner flanges.

The box consists of two side plates D, each provided with a series of recesses D' in its outer edge, and also provided with a central opening. The plates D are connected by a tube F, each plate being formed integral with the outer end of said tube, and each plate is circumferentially recessed at $D^2$ on its outer side. A series of rollers G are each provided with end journals G'.

The operation is as follows: The journals G' of the rollers G are seated in the recesses D' of the plates D, and the ring B placed over or around the rollers. The edges of said ring are then seated in the circumferential grooves $A^2$ on the inner sides of the plates A. At the same time a sheave (not shown) is secured by bolts C between the said plates A. The tube F is then placed on a shaft. (Not shown.) It will be observed that the rollers have a bearing on the inner side of the ring B, and that said rollers and their box are held within the casing by means of the flanges formed by the circumferential recesses $D^2$, which lie within or between the inner flanges formed by the plates A, as shown in Fig. 2. There is an intervening space between the rollers and the tube F, so that the only contact of said rollers is with the inner side of the ring B. The journal arrangement of the rollers is such that they move freely in their bearings.

Having thus described our invention, what we claim as new, and desire to secure by Letters Patent, is—

1. The combination, with the outer casing, of a rotary tubular box therein and a series of rollers journaled thereon parallel with its axis, the faces of the rollers contacting with the inner side of the casing, and there being a space formed between the outer surface or periphery of the tubular box and the rollers to prevent frictional contact, substantially as set forth.

2. In an anti-friction bearing, a casing consisting of two plates A, each provided on its inner side with a circumferential groove and a band-ring seated in said grooves, in combination with a box consisting of a tube F, grooved and recessed flanges D, secured to the respective ends of said tube, and rollers G, journaled in the recesses of said flanges D, substantially as shown and described.

BETHUEL G. HANDY.
GEORGE H. HANDY.

Witnesses:
EDW. M. CLARK,
C. SEDGWICK.